March 18, 1952     W. A. ANDERSON     2,589,321
IRRIGATION SYSTEM

Filed March 4, 1948     2 SHEETS—SHEET 1

INVENTOR.
William A. Anderson
BY
ATTORNEY

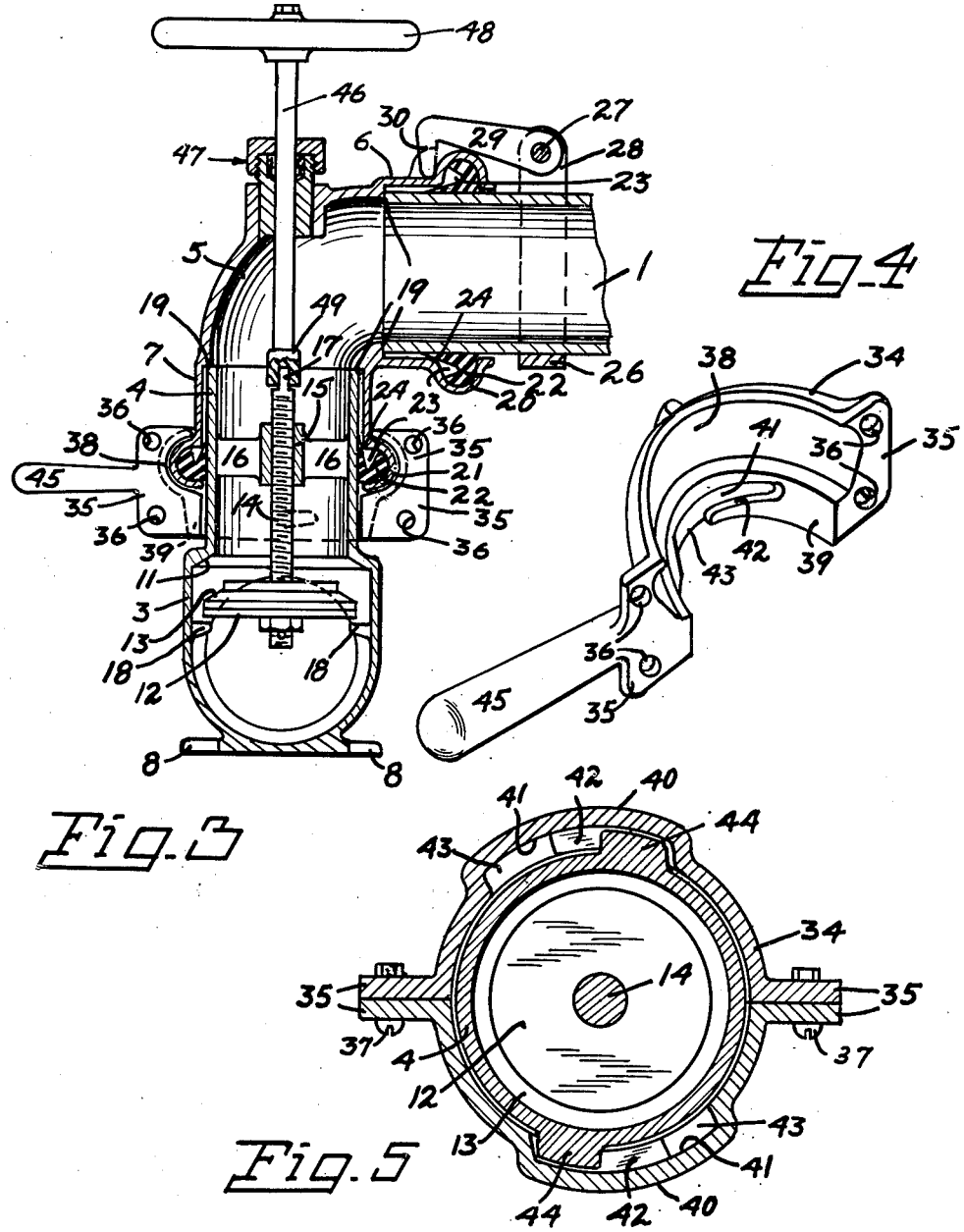

Patented Mar. 18, 1952

2,589,321

UNITED STATES PATENT OFFICE 2,589,321

IRRIGATION SYSTEM

William A. Anderson, Spokane, Wash., assignor to Anderson-Miller and Poston Mfg. Co., Spokane, Wash.

Application March 4, 1948, Serial No. 13,040

3 Claims. (Cl. 137—69)

1

This invention relates to an improved coupling and valve for an irrigation system and it is one object of the invention to provide a coupling by means of which a branch pipe may be connected with a main pipe line and temporarily held in operative connection with the main line, the branch pipe being then detached and moved to another location along the main pipe line. It will thus be seen that by providing a main pipe line extending from a force pump and transferring a distributor pipe from one outlet of the main pipe line to another an entire field may be progressively watered and the distributor pipe then moved to another field to be irrigated.

Another object of the invention is to provide an elbow coupling of such construction that it may be easily applied to an upstanding neck of a T-coupling interposed between pipe sections of a main pipe line and also connected with an end of a distributor pipe, the elbow coupling being so secured to the neck of the T-coupling that it may be easily and quickly released without use of wrenches or like tools when the distributor pipe is to be transferred to another T-coupling.

Another object of the invention is to provide the T-coupling with a valve having an upwardly extending stem and the elbow coupling with a turning shaft which has turning engagement with the valve stem when the elbow coupling is applied to the neck of the T-coupling and is released from the valve stem when the elbow coupling is drawn upwardly out of engagement with the T-coupling.

Another object of the invention is to provide an elbow coupling which will be firmly held to the distributor pipe but may be easily released therefrom when so desired.

Another object of the invention is to provide a combined coupling and valve which is of simple construction, efficient in operation and capable of being manufactured at low cost.

The invention is illustrated in the accompanying drawings wherein:

Fig. 3 is a sectional view taken vertically through the coupling.

Fig. 4 is a perspective view of one section or jaw of a clamp by means of which the elbow joint of the coupling is connected with the T-joint thereof.

Fig. 5 is a transverse sectional view taken along the line 5—5 of Figure 1.

2

Figure 1:
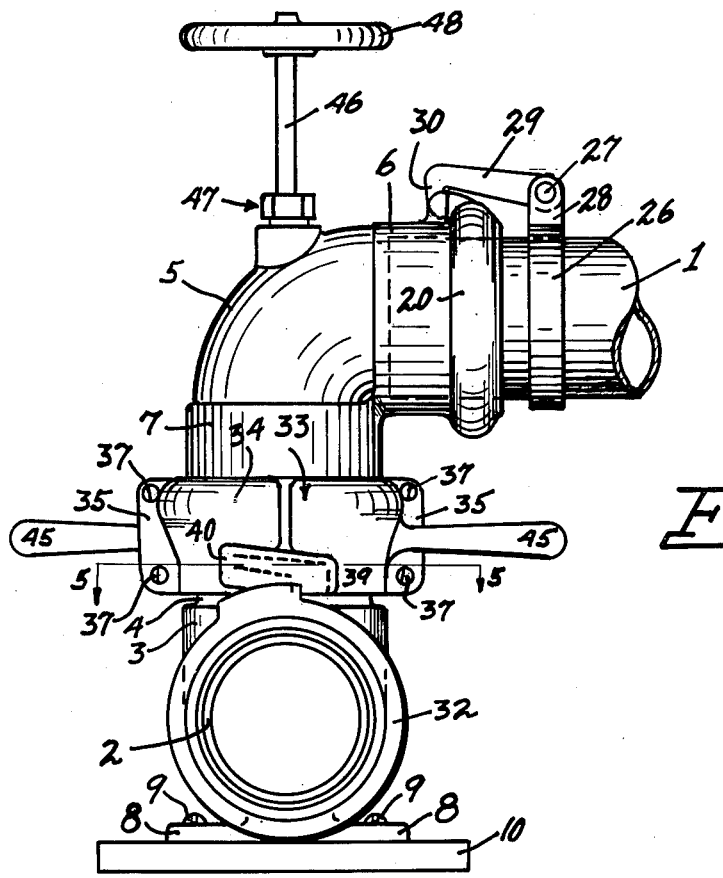
Fig. 1 is a view showing the improved coupling in elevation and a distributor pipe connected therewith.

The improved combination coupling and valve is used for connecting a distributor pipe 1 with a pipe line which may be of any length desired and extends from a force pump by means of which water is withdrawn from an irrigation ditch or canal. The pipe line or main pipe 2 extends across a field and is formed of a plurality of pipe sections between which the improved couplings are located. The distributor pipe is removably secured so that it may be transferred from one location to another and sections of the field successively watered. Ends of the pipe 1 and the sections of the pipe line 2 are unthreaded as these pipes are to be firmly but detachably secured and thus allow the pipes to be easily assembled to accomodate the pipe line to the length or width of a field across which it extends and also allow the distributor pipe to be easily transferred from one position to another along the pipe line.

The improved coupling has a lower section in the form of a T-joint 3 having an upstanding neck 4 and an upper section or elbow joint 5 having a horizontally extending upper arm 6 and a depending lower arm 7 which fits about the upstanding neck 4 of the T-joint. Feet 8 extend from the bottom of the T-joint and are formed with openings to receive screws 9 by means of which this joint is secured to a board 10 serving as a base for the joint and allowing the joint to rest upon the ground without turning over. An internal valve seat 11 is formed within the T-joint at the junction of the neck 3 with the body of this joint and within the body of the joint is disposed a valve head or disk 12 carrying a rubber gasket 13. A threaded valve stem 14 is mounted vertically through the center of the valve head or disk 12 and passes through the internally threaded sleeve 15 forming a portion of a spider which has its arms 16 formed integral with or otherwise firmly secured to the neck 4. The upper end 17 of the valve stem is squared so that the stem may be readily turned to shift the valve head upwardly to a closed position against the valve seat 11 or downwardly to the opened position shown in Figure 3. Lugs 18 within the body portion of the T-joint limit downward movement of the valve head or disk.

Figure 2:
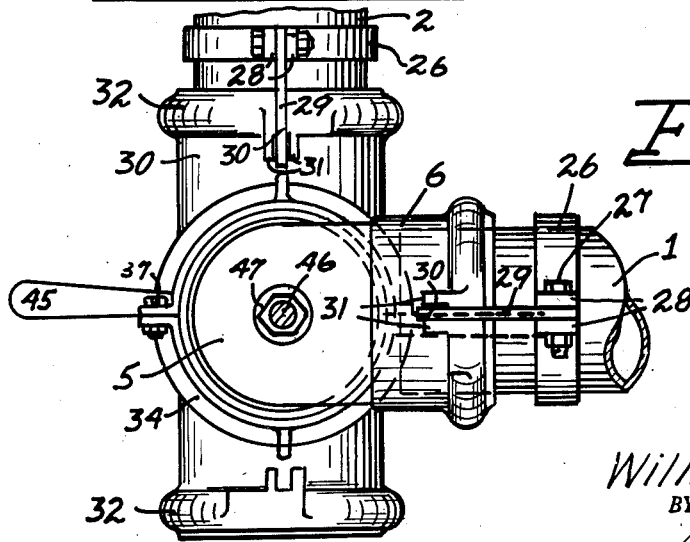
Fig. 2 is a top plan view of the improved coupling.

The upper coupling section or elbow joint 5 has its arms of such internal diameter that they fit loosely about the distributor pipe 1 and the neck 4 of the T-joint or lower section and at inner ends of these arms are circumferentially extending shoulders 19 for abutting engagement by the distributor pipe and the neck. Outer end portions of the arms are formed with outstanding circumferentially extending collars 20 and 21 and since these collars are hollow and open at their inner sides they form internal annular pockets in which gaskets 22 are mounted. These gaskets or packing rings are formed of rubber, and referring to Figure 3 it will be seen that each packing ring is grooved, as shown at 23, to form inner and outer lips 24 and 25 which face inner ends of the necks or arms of the elbow joint. The inner lip fits tightly about the pipe 1 or the neck 4 and extends into the arm and is of a feather edge formation so that water under pressure will be caused to flow over the inner lip and into the groove 23 where it applies pressure to the outer lip and forces this lip tightly against the wall of the pocket. Therefore as the pressure increases a tighter fit will be created and leakage of water out of the arms 6 and 7 will be prevented. A collar or clamping ring 26 fits about the distributor pipe and is held tightly thereon when the bolt 27 which passes through its ears 28 is tightened. The bolt carries a hook or latch 29 which may have pivotal movement upon the bolt and at its free end the hook is formed with a bill 30 having a sloping front edge face and a rounded free end so that when the distributor pipe is thrust into the upper arm 6 of the elbow joint the bill will ride over the curved surface of the collar 20 and engage back of the same between ears or tongues 31 and firmly hold the distributor pipe against movement out of the arm 6. By this agreement the distributor pipe will be firmly held in engagement with the elbow joint of the coupling but may be easily released and withdrawn when it is to be transferred to another coupling. The distributor pipe may be connected with any conventional type of spraying nozzle. Collars 32 which are of the same construction as the collars 20 are formed at ends of the T-joint and for engagement by the hooks of clamps secured about ends of the pipe sections forming the main pipe line, and since these clamps are of the same construction as the clamp carried by the distributor pipe the same reference characters have been applied thereto in Figure 2.

In order to releasably secure the lower arm 7 of the elbow joint about the upstanding neck of the T-joint there has been provided a clamping collar 33. This clamp consists of companion jaws 34 which cooperate with each other to form a circular clamp and at their ends are formed with tongues or wings 35 through which openings 36 are formed to receive bolts 37 by means of which the clamp is held about the collar 21 of the elbow joint. The jaws 34 are of concavo-convexed formation so that they are each formed with an internal channel 38 to receive the collar 21 and below this channel each jaw is formed with a depending lip 39. Enlargements or ribs 40 project outwardly from the jaws and at the enlargements the jaws are formed internally with circumferentially extending recesses 41 each having a lower edge wall 42 extending at an upward incline from an inlet mouth 43. The recesses are therefore of a bayonet slot formation and when the clamp is applied about the collar 21 in such position that ears 44 extending laterally from the collar pass through the entrance mouths 43 and the clamp then turned the same action which takes place between the ears and the sloping walls of the recesses will cause the lower arm of the elbow joint to be securely held in place about the neck of the T-joint and a watertight fit provided between the same. A handle 45 projects from each jaw and project from the clamp at diametrically opposite sides thereof so that by grasping these handles the clamp may be grasped and easily turned about the elbow joint.

The valve 12 is to be opened when the distributor pipe is applied and closed when it is removed from the elbow joint to prevent escape of water from the main pipe line and in order to do so there has been provided an adjusting shaft 46 which extends vertically above the valve stem 14 and passes through a packing gland 47 at the top of the elbow joint. This shaft is slidably and rotatably mounted through the packing gland and at its upper end carries a wheel 48 by means of which it is turned and also shifted longitudinally. At its lower end the shaft is formed with a socket 49 to receive the squared upper end of the valve stem, and from an inspection of Figure 3 it will be seen that when the shaft is turned the stem will be rotated with it and the valve moved to opened or closed position according to the direction in which the shaft is turned. Since the squared upper end of the valve stem fits freely in the socket 49 it may be fitted into the socket when the elbow joint is applied to the T-joint and withdrawn from the socket when the elbow joint is removed and since the shaft 46 is slidable vertically through the packing gland it may be shifted vertically into position for effecting engagement of the squared end of the valve stem in the socket after the elbow joint has been applied to the T-joint.

When an irrigation system which includes in its construction the improved combination couplings and valves is installed for use a pipe line is extended from a pressure pump which obtains water from an irrigation canal. This pipe line is formed of a suitable number of pipe sections to form a pipe line of sufficient length to extend across a field to be watered and is closed at its outer end by a suitable plug or cap. The valves of the couplings are closed so that water will not flow from the pipe line and be wasted. A distributor pipe of suitable length is connected with a sprinkler of conventional construction and extends from the sprinkler towards the pipe line. The outer end of the distributor pipe is thrust into the upper horizontally extending arm of the elbow joint of a coupling near one side or end of a field and when the bill of the hook or latch carried by the distributor pipe is engaged back of the collar 20 the distributor pipe will be firmly held to the coupling. The valve of the coupling may then be opened and water will flow through the distributor pipe to the sprinkler. After water has been discharged from the sprinkler for a sufficient length of time to wet the ground the valve is closed, the distributor pipe detached from the coupling and moved to another coupling where it is applied and the valve of this coupling opened. It will thus be seen that field may be watered in sections as the distributor pipe is moved along the pipe line in step by step movements and the sprinkler moved with it.

Having thus described the invention, what is claimed is:

1. A valve controlled coupling comprising a lower section having a neck extending upwardly, an upper section having a lower arm fitting about the neck of the lower section, a valve in the lower section having an upwardly extending stem, a sleeve mounted vertically in said neck and through which said stem is threaded, a seat for said valve about the lower end of the neck, and a shaft slidably and rotatably extending into the upper section through the top thereof and detachably engaged with the upper end of said stem for turning the stem and moving the valve relative to the seat to opened and closed positions.

2. A valve controlled coupling comprising a lower section consisting of a T-joint adapted to be mounted between pipe sections with its neck extending upwardly, an upper section having an outlet, means for detachably securing said upper section about the neck of the lower section, an internally threaded sleeve extending vertically in said neck and having supporting arms fixed to side portions of the neck, a valve seat at the lower end of said neck, a valve disk in said lower section below the neck, a threaded stem extending upwardly from the valve disk and through said sleeve, lugs in said lower section under the valve disk for limiting downward movement thereof away from the valve seat to an opened position, a packing gland carried by the upper section above said stem, a shaft rotatably and slidably passing vertically through said packing gland and having a socket at its lower end for removably receiving a squared upper end of said stem, and means at the upper end of said shaft for turning the shaft and thereby rotating the stem to move the valve disk to opened and closed positions.

3. A valve controlled coupling comprising a lower section having a neck extending upwardly, an upper section detachably mounted about the neck of the lower section, an internally threaded sleeve extending vertically in said neck and spaced from side portions of the neck, a valve seat about the lower end of said neck, a valve disk in said lower section below the neck, a threaded stem extending upwardly from the valve disk and threaded through said sleeve, means in said lower section under the valve disk for limiting downward movement of the valve disk away from the valve seat to an opened position, a packing gland carried by the upper section and disposed vertically above said stem, a shaft rotatably and slidably passing vertically through said packing gland and having its lower end detachably engaged with upper end of the stem, and means at the upper end of said shaft for turning the shaft and thereby rotating the stem to move the valve disk to opened and closed positions.

WILLIAM A. ANDERSON.

REFERENCES CITED

The following references are of record in the file of this patent:

UNITED STATES PATENTS

| Number | Name | Date |
|---|---|---|
| 658,288 | Church | Oct. 9, 1900 |
| 972,384 | Kellar | Oct. 11, 1910 |
| 1,120,861 | Thalman | Dec. 15, 1914 |
| 1,287,128 | Snow | Dec. 10, 1918 |
| 1,399,434 | Kurtz | Dec. 6, 1921 |
| 1,581,723 | Dorn | Apr. 20, 1926 |
| 2,120,677 | Oliver | June 14, 1938 |
| 2,464,466 | Stout | Mar. 15, 1949 |
| 2,470,539 | Wyss | May 17, 1949 |
| 2,474,431 | Lipman | June 28, 1949 |
| 2,519,847 | Neely | Aug. 22, 1950 |